US012794852B2

(12) United States Patent
Harnathka et al.

(10) Patent No.: US 12,794,852 B2
(45) Date of Patent: Nov. 10, 2026

(54) ADVANCED DNS RESPONSE CACHE

(71) Applicant: Palo Alto Networks, Inc., Santa Clara, CA (US)

(72) Inventors: Damini Kumari Harnathka, Newark, CA (US); Kashyap Tavarekere Ananthapadmanabha, San Jose, CA (US); Yu-Hsiang Kao, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 58 days.

(21) Appl. No.: 18/929,347

(22) Filed: Oct. 28, 2024

(65) Prior Publication Data

US 2026/0122029 A1 Apr. 30, 2026

(51) Int. Cl.
*H04L 61/4511* (2022.01)
*H04L 9/40* (2022.01)

(52) U.S. Cl.
CPC ...... *H04L 61/4511* (2022.05); *H04L 63/0209* (2013.01); *H04L 63/1408* (2013.01)

(58) Field of Classification Search
CPC ............. H04L 61/4511; H04L 63/0209; H04L 63/1408; H04L 61/58
See application file for complete search history.

(56) References Cited

U.S. PATENT DOCUMENTS 8,621,556 B1 * 12/2013 Bharali .................. H04L 63/02 726/1
9,444,916 B2 9/2016 Backholm
9,992,234 B2 6/2018 Lemon
10,063,650 B2 8/2018 Kim
10,448,325 B2 10/2019 Xu
10,666,602 B2 5/2020 Tuliani
10,686,753 B2 6/2020 Redekop
11,190,482 B2 11/2021 Lee
2004/0267907 A1 * 12/2004 Gustafsson ......... H04L 67/2885 709/219
2016/0099967 A1 * 4/2016 Stemm .................... G06F 21/55 726/1
2016/0330174 A1 * 11/2016 Sullivan .................. H04L 63/12
2017/0011133 A1 * 1/2017 Shalunov .............. G06F 16/986
2022/0116411 A1 * 4/2022 Melicher ............... G06F 21/566
2022/0210114 A1 * 6/2022 Buck ....................... H04L 63/10

OTHER PUBLICATIONS

Askitis et al. (HAT-trie: a cache-conscious trie-based data structure for strings, 2007, ACM digital library) (Year: 2007).*

* cited by examiner

*Primary Examiner* — Abdulkader M Alriyashi
(74) *Attorney, Agent, or Firm* — Van Pelt, Yi & James LLP

(57) ABSTRACT

The present application discloses a method, system, and computer system for using advanced domain name system (ADNS) response cache in connection with handling network traffic. The method includes (I) receiving a DNS response sample, (ii) determining whether the ADNS response cache local to a security entity stores a DNS traffic classification for a DNS record associated with the DNS response sample, and (iii) in response to determining that the ADNS response cache stores the DNS traffic classification for the DNS record associated with the DNS response sample, handling the DNS response sample based at least in part on the DNS traffic classification obtained from the ADNS response cache.

25 Claims, 8 Drawing Sheets

400

200

300

400

500

600

ADVANCED DNS RESPONSE CACHE

BACKGROUND OF THE INVENTION

The Domain Name System (DNS) is a critical component of internet infrastructure, serving as the directory that translates human-readable domain names into IP addresses used for communication between devices. Despite its importance, DNS is increasingly becoming a target for cyberattacks, including DNS spoofing, cache poisoning, DNS tunneling, and other malicious activities aimed at compromising security and privacy. Cybercriminals exploit DNS traffic to redirect users to malicious websites, exfiltrate data, or evade detection mechanisms, creating a significant need for enhanced DNS security solutions.

BRIEF DESCRIPTION OF THE DRAWINGS

Various embodiments of the invention are disclosed in the following detailed description and the accompanying drawings.

DETAILED DESCRIPTION

Figure 1:
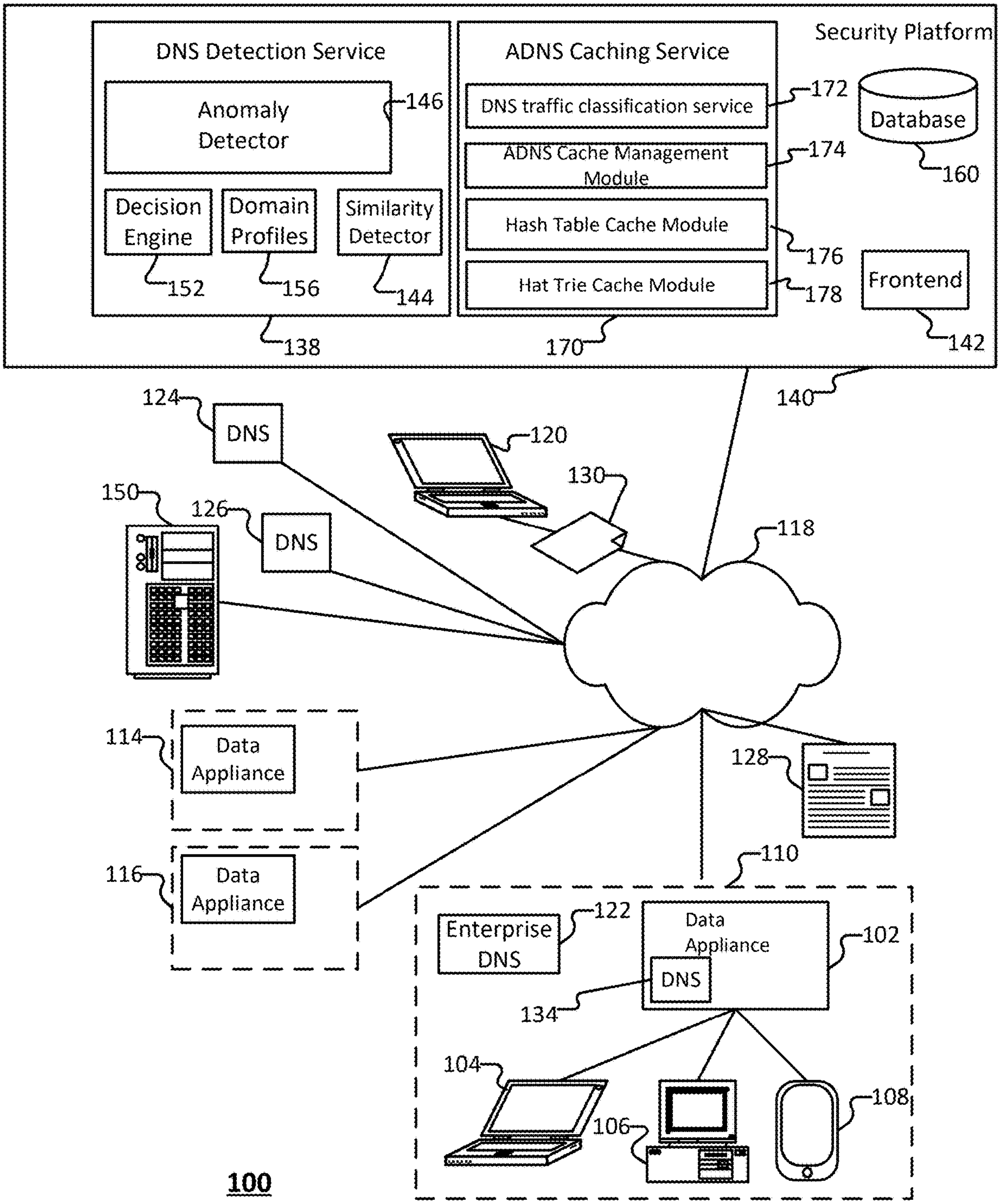
FIG. 1 is a block diagram of an environment for providing a security service to a network according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a security entity may be a network node (e.g., a device) that enforces one or more security policies with respect to information such as network traffic, files, etc. As an example, a security entity may be a firewall. As another example, a security entity may be implemented as a router, a switch, a Domain Name System (DNS) resolver, a computer, a tablet, a laptop, a smartphone, etc. Various other devices may be implemented as a security entity. As another example, a security may be implemented as an application running on a device, such as an anti-malware application.

As used herein, an Domain response is a type of DNS response that is provided to a client/browser (e.g., in response to a DNS query) when the domain or website associated with the corresponding DNS query does not exist. For example, the domain or website does not exist within the database of the DNS server that is processing the DNS query. As another example, the Domain response may include a packet indicating that the DNS server cannot identify a DNS record for the website or domain in its database.

As used herein, DNS data may include data related to the DNS queries and responses that occur when devices connect to the internet. This data can be used to provide insights into network performance, security, and user behavior. DNS data can include information such as: query data and DNS response data. The query data may include domain names being queried, the source IP addresses of the queries, the timing of the queries, and the types of records being requested (e.g., A, AAAA, CAME, MX records). The response data can comprise IP addresses returned in response to DNS queries, the time it takes to resolve these queries, and any errors or failures in the resolution process.

Various embodiments provide a method, system, and computer system for using advanced domain name system (ADNS) response cache in connection with handling network traffic. The method includes (I) receiving a DNS response sample, (ii) determining whether the ADNS response cache local to a security entity stores a DNS traffic classification for a DNS record associated with the DNS response sample, and (iii) in response to determining that the ADNS response cache stores the DNS traffic classification for the DNS record associated with the DNS response sample, handling the DNS response sample based at least in part on the DNS traffic classification obtained from the ADNS response cache.

Cybersecurity solutions have evolved to incorporate real-time monitoring and analysis of DNS traffic. By classifying DNS responses as either malicious or benign, security systems can detect and mitigate DNS-based attacks more effectively. Such classifications are typically based on an analysis of various factors, including the reputation of the domain, known threat intelligence, and traffic patterns. These classifications allow security entities, such as firewalls or DNS resolvers, to enforce policies that protect against potentially harmful DNS responses.

Various embodiments leverage DNS traffic classifications to enhance DNS security. Specifically, various embodiments utilizes real-time or precomputed classifications of DNS responses to determine how to handle DNS traffic in a secure manner. The classifications indicate whether a DNS response is malicious, benign, or unknown, enabling the system to take appropriate actions based on these determinations.

In operation, the system monitors DNS traffic and processes DNS queries. When a DNS response is received, the system references a local cache or a cloud-based service to retrieve a classification for the domain or IP address contained in the response. This classification may be based on reputation data, behavioral analysis, or machine learning models designed to detect DNS-based threats. If the response is classified as malicious, the system may block the DNS request, prevent access to the associated domain or IP address, and log the event for further analysis. If the response is classified as benign, the system allows the traffic to proceed, enabling the requested domain resolution and corresponding connection.

For DNS responses that lack an immediate classification, the system can query an external security platform (e.g., a cloud security service) for real-time classification. This platform may use a variety of classifiers, such as rule-based systems, machine learning algorithms, and heuristic models, to analyze DNS traffic and provide a classification. Once a classification is obtained, it is cached locally for future reference, minimizing the need for repeated queries and improving overall system efficiency.

Various embodiments include the ability to enforce predefined security policies based on the DNS traffic classification. For example, if a DNS response is determined to be malicious, the system can automatically block the query, prevent any data transfer associated with that domain, and notify administrators of the threat. Additionally, the system can be configured to redirect traffic or apply different policies, such as quarantining traffic associated with suspicious domains or performing further verification on unknown classifications.

This solution addresses the need for more dynamic and intelligent handling of DNS traffic in modern networks. By integrating DNS traffic classifications with security enforcement mechanisms, the ability of security entities to prevent DNS-based attacks in real-time is enhanced. Moreover, various embodiments improve network performance by leveraging cached classifications and reducing the overhead associated with querying external threat intelligence platforms. This approach ensures that DNS traffic is handled not only with speed but also with a higher level of security, reducing the risks associated with malicious DNS responses.

Various embodiments incorporate more advanced DNS traffic monitoring and classification capabilities. Inline firewalls, DNS resolvers, and other security entities are being equipped with the ability to evaluate DNS responses in real-time, classifying them as either benign or malicious based on various criteria. Such systems can help prevent DNS-based attacks and improve overall network security.

According to various embodiments, a security entity, such as an inline firewall, maintains an advanced DNS (ADNS) cache. This ADNS cache not only stores DNS responses but also includes classifications or verdicts regarding whether the DNS response or corresponding DNS record is malicious or benign. These classifications can be derived from real-time DNS traffic analysis, enabling the security entity to characterize DNS traffic and enforce security policies accordingly.

If the local advanced DNS cache does not contain a classification (e.g., a DNS traffic classification) for a particular DNS query, the security entity can query a cloud-based security platform to obtain a real-time classification. The cloud platform employs various techniques to classify DNS traffic, such as machine learning models, heuristic rule-based classifiers, or a combination of both. Once a classification is obtained, it is used in connection with handling the DNS traffic. In some embodiments, the real-time DNS traffic classification obtained from the cloud-based security platform is stored locally in the advanced DNS cache for future use, minimizing latency and improving the efficiency of threat detection.

In some embodiments, the advanced DNS cache implements a cache that is structured as a hash table, where the resource record data (raita), such as IP addresses, is used as a key to index DNS traffic classifications. Specifically, the hash table may be implemented as a for cache Type A (IPv4) or Type AAAA (IPv6) DNS records, allowing for efficient lookup and retrieval of DNS traffic classifications based on the IP addresses returned in DNS responses. By indexing classifications using raita, the system ensures rapid access to previously determined DNS classifications, thereby improving performance while maintaining security.

Additionally, in other embodiments, the local advanced DNS cache may implement a cache that is structured as a Hybrid Associative Trie (HAT trie), which is well-suited for situations where the cache needs to store domain names efficiently. The HAT trie cache allows DNS traffic classifications to be indexed using the domain name associated with a particular DNS record. In these cases, the domain name (or domain portion of a DNS query) is used as the key, and the associated DNS traffic classification is stored as the value in the trie structure.

The HAT trie provides a compact and efficient way of storing and querying domain names, particularly for high-performance scenarios involving large volumes of DNS data. It combines the fast access times of a hash table with the ordered structure of a trie, making it ideal for storing variable-length domain names. For example, in the case of Type A or Type AAAA DNS records, the advanced DNS cache uses the HAT trie to store DNS classifications, where the domain name serves as the key, and the classification (whether malicious or benign) is the stored value. This enables quick lookups based on domain names, allowing the security entity to efficiently determine the status of DNS traffic related to a given domain.

In some embodiments, the system (e.g., an ADNS cache) implements a HAT trie cache that uses raita as a key, where the IP address is the indexed element, and the value is the domain name or associated DNS traffic classification. This flexible indexing mechanism allows the advanced DNS cache to support multiple lookup methods, ensuring that both domain-based and IP-based queries can be efficiently handled depending on the context of the DNS traffic.

By incorporating both hash table and HAT trie structures, the advanced DNS cache optimizes the storage and retrieval of DNS traffic classifications. The hash table provides rapid access to DNS records based on IP addresses, while the HAT trie efficiently manages domain name-based queries. Together, these data structures enhance the system's (e.g., the security entity's) ability to detect and mitigate DNS-based threats in real time.

FIG. 1 is a block diagram of an environment for providing a security service to a network according to various embodiments. In various embodiments, system 100 is implemented in connection with one or more of systems 200 and/or 300 of FIG. 2 or 3, ADNS cache 400 of FIG. 4, ADNS response cache of FIG. 5, and/or one or more of processes 600-800 of FIGS. 6-8.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains, DNS hijacked domains, or stockpiled domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android. ask files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with remote security platform 140. Security platform 140 can provide a variety of services, including classifying domains (e.g., predicting whether a domain is a malicious domain, etc.), classifying DNS response records (e.g., predicting whether a domain IP pair in a DNS response is a DNS hijacked record, etc.), classifying network traffic, providing a mapping of signatures to certain domains or DNS records (e.g., a DNS record for which a predicted likelihood that the record is a DNS hijacked record exceeds a predefined likelihood threshold, etc. a mapping of domains or DNS records to domain or DNS record data (e.g., domain certificates, pen's data, active DNS data, WHOIS data, etc.), performing static and dynamic analysis on malware samples, monitoring new domains and new DNS records (e.g., detecting new domains for which a certificate is issued/generated), assessing maliciousness of domains, determining whether a DNS record associated with a traffic sample is (or is likely to be) a DNS hijacked record, providing a list of signatures of known exploits (e.g., malicious input strings, malicious files, malicious domains, etc.) to data appliances, such as data appliance 102 as part of a subscription, detecting exploits such as malicious input strings, malicious files, DNS hijacked records or malicious domains (e.g., an on-demand detection, or periodical-based updates to a mapping of domains or DNS records to indications of whether the domains or DNS records are malicious or benign), providing a likelihood that a domain is malicious (e.g., a DNS hijacked record) or benign (e.g., not DNS hijacked), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, DNS records, or domains are malicious, providing an indication that an input string, file, DNS record, or domain is malicious (or benign). In some embodiments, services provided by security platform 140 additionally comprise simulating DNS hijacking attacks/campaigns (e.g., generating synthetic DNS hijacked records), and/or training classifiers (e.g., training machine learning models, such as to be used to provide detection of DNS hijacked domains).

In some embodiments, security platform 140 classifies the domains in response to receiving a network traffic sample or according to a predefined schedule. In connection with detecting DNS hijacked records, security platform 140 can obtain information pertaining to the domains (e.g., pen's data, geolocation data, etc.) and classify the DNS traffic, such as DNS records (e.g., the corresponding domains), based at least in part on querying a classifier (e.g., a machine learning model, a heuristics-based model, a rule-based model, etc.). Security platform 140 may perform periodic polling or monitoring of pen's data and geolocation data, such as in connection with training a classifier, and/or classifying a set of domains or DNS records. In some embodiments, security platform 140 analyzes or classifies DNS telemetry data to identify exploits or to assist network administrators to improve/optimize the configuration of the system.

In various embodiments, results of analysis (and additional information pertaining to applications, domains, etc.), such as an analysis or classification performed by security platform 140, are stored in database 160. In various embodiments, security platform 140 comprises one or more dedicated commercially available hardware servers (e.g., having multi-core processor(s), 32G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware Six, Citrix eServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remaining portions of security platform 140 provided by dedicated hardware owned by and under the control of the operator of security platform 140.

According to various embodiments, security platform 140 comprises DNS detection service 138 and/or ADNS caching service 170. Security platform 140 may include various other services/modules, such as a malicious file detector, a malicious traffic detector, a parked domain detector, a DNS hijacked domain or DNS record detector, a DNS traffic classifier, an application classifier or other traffic classifier, etc. DNS detection service 138 is used in connection with analyzing samples of domains and/or automatically detecting DNS hijacked domains. ADNS caching service 170 is used in connection with managing and providing an ADNS cache. The ADNS cache can be deployed at a security entity such as an inline firewall (e.g., pushed by ADNS caching service 170) to perform inline detections (e.g., to determine whether or how to handle the DNS traffic (e.g., a DNS response sample) DNS telemetry data (e.g., reported to security platform 140 from various security entities within the network) and analyzing the received DNS telemetry data.

In some embodiments, ADNS caching service 170 comprises one or more of DNS traffic classification service 172, ADNS cache management module 174, hash table cache module, and/or HAT trie cache module 178.

ADNS caching service 170 uses DNS traffic classification service 172 to obtain a DNS traffic classification. The DNS traffic classification service 172 may obtain a request for a DNS traffic classification, such as from a security entity (e.g., an inline firewall). The security entity may request a DNS traffic classification in response to determining that its locally stored ADNS cache does not store a DNS traffic classification for the applicable record or corresponding domain. As an example, the security entity requests a real-time DNS traffic classification from DNS traffic classification service 172. In response to receiving the request for a DNS traffic classification, DNS traffic classification service can query a detector or other classification module. For example, DNS traffic classification service 172 queries DNS detection service 138 for a classification. The DNS detection service 138 may query one or more classifiers in connection with determining a verdict for the DNS traffic (e.g., the corresponding DNS record or domain).

ADNS caching service 170 uses the ADNS cache management module 174 to store the DNS traffic classification (or information pertaining to the DNS traffic classification) to the ADNS cache. Additionally, ADNS cache management module 174 manages the ADNS cache, such as by determining the entries (e.g., the DNS traffic classification) to be cached, and causes the ADNS cache to be deployed by network security entities, such as inline firewalls (e.g., next generation firewalls). ADNS cache management module 174 can push the ADNS cache or updates thereto to network security entities. In some embodiments, ADNS cache management module 174 updates the ADNS cache. The updating the ADNS cache may include storing new entries in the ADNS cache, such as storing newly obtained DNS traffic classifications, or changing a composition of the ADNS cache (e.g., adding new DNS traffic classifications, removing DNS traffic classifications, etc.), such as based on determining that a priority of DNS records has changed (e.g., the priority may be determined based on one or more of a popularity of a corresponding domain, a volume of traffic to/from the domain over a predefined threshold period of time, etc.).

In some embodiments, ADNS cache management module 174 queries hash table cache module 176 and/or HAT trie cache module 178 for entries in the ADNS cache. For example, ADNS cache management module 174 obtains a hash table cache from hash table cache module 176 and one or more HAT trie caches from HAT trie cache module 178.

According to various embodiments, ADNS cache management module 174 can manage a plurality of different caches (e.g., constituent caches comprised in the ADNS cache) for the use in connection with providing detections for different types of DNS records. For example, ADNS cache management module 174 can manage a plurality of different caches that are implemented for different DNS record types or different subsets of DNS record types.

ADNS caching service 170 uses hash table cache module 176 to determine a hash table cache that may be implemented as part of the ADNS cache. In some embodiments, the hash table cache is implemented for one or more of an A type of DNS record and/or an AAAA type of DNS record. The hash table cache module 176 stores in the hash table cache verdicts (e.g., DNS traffic classifications) for a set of resource records. The hash table cache module 176 may implement a key-value pairings, where they key corresponds to information obtained from the raita, such as the IP address, and the value corresponds to information obtained from the raita, such as the domain. According to various embodiments, the value field may be configured to support storing prefix match entries or wildcards, such as a small linked list from an entry in the hash table cache of the ADNS cache.

According to various embodiments, because a large percentage of DNS responses belong to A/AAAA type categories and IPs are always exact matches, ADNS caching service 170 is configured to separate out these signatures (e.g., as compared to other types of categories) and store them as a hash for efficient lookup. In some embodiments, the system implements the hash table cache index according to the IP address (e.g., the key is the IP address obtained from the raita). The value field in the hash table cache stores one or more of the Retyped, a DNS category, a threat identifier (id), a threat name, an expiry time (e.g., an time/date on which the cached DNS traffic classification expires or is no longer deemed valid), and other metadata along with the rrname. In some embodiments, the ADNS cache is queried (e.g., for A type or AAAA type DNS records) to find a match for a particular DNS traffic sample by querying a hash table cache (e.g., performing a hash lookup) to find a match based on the raita (e.g., the IP address) and then querying another cache (e.g., a HAT trie cache) in the ADNS cache based on information obtained from the value field in the corresponding entry stored in the hash table cache (e.g., the rrname from the value struct) to determine whether the ADNS cache stores a complete match for the DNS traffic sample.

ADNS caching service 170 uses HAT trie cache module 178 to determine one or more hat tries that may be implemented as part of the ADNS cache. In some embodiments, HAT trie cache module 178 configures (e.g., determines) a first HAT trie cache indexed according to rrname (e.g., the domain name) and a second HAT trie cache indexed according to raita (e.g., the IP address).

In some embodiments, the first HAT trie cache indexed according to rrname can be used in connection with querying the ADNS cache for a domain verdict (e.g., a DNS traffic classification based on the domain) for the following types of DNS records: (a) an A type DNS record, (b) an AAAA type DNS record, (c) an MX type DNS record, (d) an NS type DNS record, (e) a CAME type DNS record, (f) a PTR type DNS record, (h) an SOA type DNS record, (I) an SRV type DNS record, and (j) a TXT type DNS record).

In some embodiments, the second HAT trie cache indexed according to raita can be used in connection with querying the ADNS cache for a resource record verdict (e.g., a DNS traffic classification based on the resource record) and/or a domain verdict (e.g., a DNS traffic classification based on the domain). The second HAT trie cache can be queried for (e.g., support) one or more of the following types of DNS records: (a) an MX type DNS record, (b) an NS type DNS record, (c) a CAME type DNS record, (d) a PTR type DNS record, and (e) an SOA type DNS record.

In some embodiments, DNS detection service 138 detects/classifies a domain or DNS traffic. For example, DNS detection service 138 predicts whether a particular DNS record (e.g., a candidate domain) is a DNS hijacked record (e.g., whether the candidate domain is a DNS hijacked domain). Alternatively, DNS detection service 138 can predict whether a particular domain is a DNS hijacked domain (e.g., is associated with a DNS hijacked record). In some embodiments, DNS detection service 138 classifies the domain or DNS record based at least in part on a signature of the candidate domain or DNS record, such as by querying a mapping of signatures to domain or DNS record identifiers (e.g., a set of previously analyzed/classified domains or DNS records). As an example, DNS detection service 138 uses a signature or domain or DNS record identifier to query a blacklist of domains to check whether the candidate domain or DNS record is on the blacklist of domains. In some embodiments, DNS detection service 138 classifies the domain or DNS record based on a predicted domain or DNS record classification (e.g., a prediction of whether a candidate DNS record is a DNS hijacked record, whether the candidate record is not a DS hijacked record, or whether a candidate domain is malicious or benign, etc.). For example, DNS detection service 138 determines (e.g., predicts) the domain classification based at least in part on domain or DNS record data for the candidate domain or DNS record. Examples of domain or DNS record data include a certificate information pertaining to a certificate(s) associated with the candidate domain (e.g., the domain associated with the particular DNS request), registration information, pen's data, geolocation data, scan data, active DNS information, zone file information, WHOIS registry data, web crawled data (e.g., data obtained by crawling the website), etc.

DNS detection service 138 can determine DNS traffic classifications in response to receiving a request for a DNS traffic classification such as form a security entity (e.g., via ADNS caching service 170, for example, from DNS traffic classification service 172), or as an offline process, such as by processing batches of identified candidate domains.

In some embodiments, DNS detection service 138 determines a domain or DNS record classification for a candidate domain or DNS record based at least in part on a machine learning-based classification. As an example, DNS detection service 138 (e.g., decision engine 152) uses a machine learning-based classifier to determine a prediction of whether the candidate DNS record is a DNS hijacked record. Additionally, or alternatively, DNS detection service 138 (e.g., similarity detector 144 or domain profiles 156) may implement one or more of a fingerprinting-based classification, a heuristics-based classification, or other rule-based classification to classify the candidate domain or DNS record. For example, DNS detection service 138 performs a post-filtering with respect to the predictions generated by the machine learning-based classifier. The post-filtering can be performed using a fingerprinting-based classifier, a heuristics-based classifier, and/or other rule-based classifier to filter out potential false positives generated by the machine learning-based classifier (e.g., to remove predicted candidate DNS records that are likely not DNS hijacked domains).

In some embodiments, DNS detection service 138 (e.g., anomaly detector 146 or decision engine 152) includes a model (e.g., a machine learning model) that is trained to detect DNS hijacked domains or DNS hijacked attacks/campaigns. In some embodiments, DNS detection service 138 is trained to detect DNS hijacked records. In response to determining a predicted classification for a domain or DNS records (e.g., a candidate domain or candidate DNS record), DNS detection service 138 may determine a signature for the domain or DNS record and store the signature in a mapping of signatures to domains or DNS record classifications (e.g., an indication of whether the candidate domain or DNS record is malicious/DNS hijacked or benign/non-DNS hijacked) the domain or DNS record signature in association with the predicted classification.

In some embodiments, system 100 (e.g., security platform 140, such as via DNS detection service 138 or more particularly, anomaly detector 146 or decision engine 152, etc.) trains a classifier (e.g., a model) to detect (e.g., predict) DNS hijacked records (e.g., to predict a DNS record classification for a particular DNS record, such as DNS records intercepted by an inline security entity). The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, a neural network (NN), etc. In some embodiments, DNS detection service 138 implements a random forest model.

According to various embodiments, in response to DNS detection service 138 (e.g., anomaly detector 145 or decision engine 152) classifying the candidate record, system 100 handles the traffic to/from the candidate domain according to a predefined policy (e.g., a security policy). For example, the system queries a traffic handling policy to determine the manner by which traffic to/from a domain matching the candidate domain is to be handled. The traffic handling policy may be a predefined policy, such as a security policy, etc. The traffic handling policy may indicate that traffic to/from certain domains is to be blocked and traffic to/from other domains is to be permitted to pass through the system (e.g., routed normally). The traffic handling policy may correspond to a repository of a set of policies to be enforced with respect to network traffic. In some embodiments, security platform 140 receives one or more policies, such as from an administrator or third-party service, and provides the one or more policies to various network nodes, such as endpoints, security entities (e.g., inline firewalls), etc.

In response to determining a classification for a newly analyzed candidate record, security platform 140 (e.g., DNS detection service 138) sends an indication that records matching the candidate record are associated with, or otherwise correspond to, the determined classification. In the case that the determined classification for the candidate record is that the candidate record is a DNS hijacked record, security platform 140 provides an indication that traffic to/from a domain matching the candidate domain (e.g., the same domain signature or same originating IP address, etc.) is also to be handled according to whether the candidate domain is a DNS hijacked record. Security platform 140 can provide an indication that DNS requests and DNS responses corresponding to the candidate record predicted to be handled as a DNS hijacked record. For example, security platform 140 (e.g., DNS detection service 138) determines (e.g., computes) a signature or identifier for the domain or DNS record for the candidate record (e.g., a hash or other signature), and sends to a network node (e.g., a security entity, an endpoint such as a client device, etc.) an indication of the classification associated with the signature (e.g., an indication whether the record is a DNS hijacked record, or an indication of whether the domain is a malicious/non-malicious domain, or an indication of whether traffic to/from the domain is malicious traffic). Security platform 140 may update a mapping of signatures to domain or DNS record classifications and provide the updated mapping to the security entity. In some embodiments, security platform 140 further provides to the network node (e.g., security entity, client device, etc.) an indication of a manner by which traffic to a domain or DNS record matching the signature is to be handled. For example, security platform 140 provides to the security entity a traffic handling policy, a security policy, or an update to a policy.

In some embodiments, system 100 (e.g., DNS detection service 138 of security platform 140, or other security entity, etc.) determines whether information pertaining to a particular candidate record (e.g., a newly received candidate record to be analyzed) is comprised in a dataset of historical domains (e.g., historical network traffic, previously classified domains), whether a particular signature is associated with malicious traffic, or whether traffic corresponding to the candidate record to be otherwise handled in a manner different than the normal traffic handling. The historical information may be provided by another system or module, such as a service running on security platform 140, or by a third-party service such as VirusTotal™, or both. In response to determining that information pertaining to a candidate record (or corresponding domain) is not comprised in, or available in, the dataset of historical domains (e.g., historical or previously analyzed domains), system 100 (e.g., DNS detection service 138 or other security entity) may deem that the domain/traffic has not yet been analyzed and system 100 can invoke an analysis (e.g., a domain analysis) of the candidate record (e.g., an analysis of the domain or DNS record data for the candidate record) in connection with determining (e.g., predicting) the record (e.g., DNS record) classification. The historical information (e.g., from a third-party service, a community-based score, etc.) indicates whether other vendors or cyber security organizations deem the particular traffic as malicious or should be handled in a certain manner.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as C2 server 150, as well as to receive instructions from C2 server 150, as applicable.

DNS hijacked domains, for example, can be domains that are scams, phishing sites, or sites used to distribute C2 exploits or malware.

As an illustrative example, the environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C2 server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C2 server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C2 server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious domains, detecting parked domains, or otherwise determining that certain detected network traffic is to be further analyzed (e.g., using a finer detection model).

In some embodiments, security platform 140 comprises a network traffic classifier that provides to a security entity, such as data appliance 102, an indication of the traffic classification. For example, in response to detecting the C2 traffic, network traffic classifier sends an indication that the domain traffic corresponds to C2 traffic to data appliance 102, and the data appliance 102 may in turn enforce one or more policies (e.g., security policies) based at least in part on the indication. The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, blocking traffic to or from a particular node (e.g., a compromised device, such as a device that serves as a beacon in C2 communications), etc. As another example, in response to determining the application for the domain, the network traffic classifier provides to the security entity with an update of a mapping of signatures to applications (e.g., application identifiers).

Figure 2:
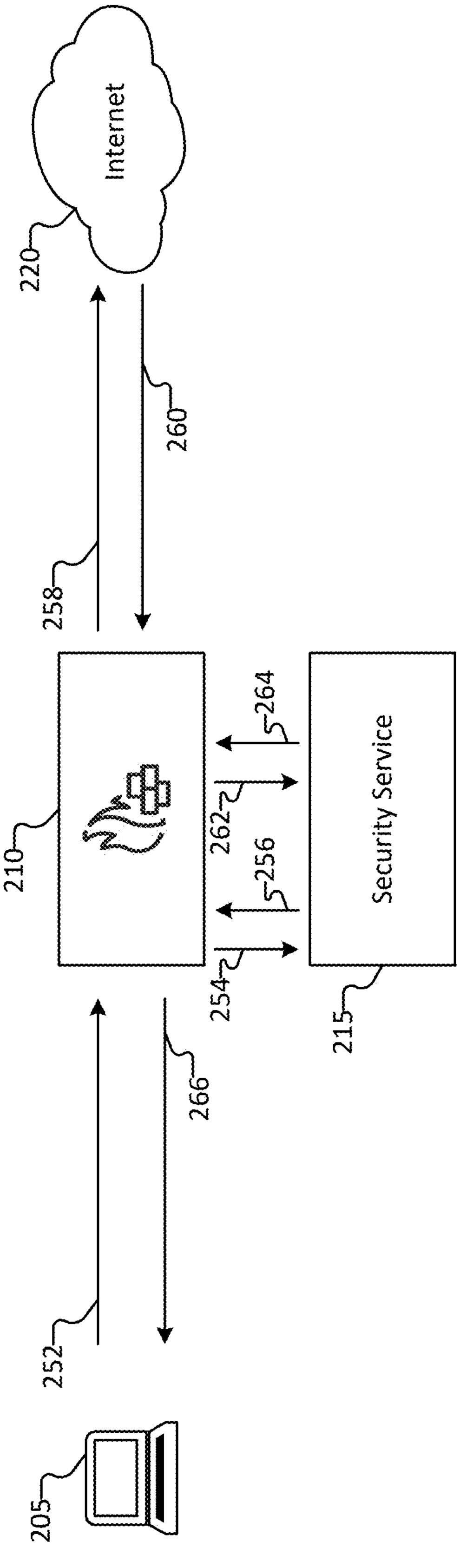
FIG. 2 is a block diagram of a system to handle DNS requests and DNS responses according to various embodiments.

FIG. 2 is a block diagram of a system to handle DNS requests and DNS responses according to various embodiments. In some embodiments, system 200 implements at least part of system 100 of FIG. 1. In some embodiments, system 200 is implemented at least in part by system 300 of FIG. 3. System 200 can implement ADNS cache 400 of FIG. 4 and/or ADNS cache 500 of FIG. 5. System 200 can implement one or more of processes 600-800 of FIGS. 6-8.

System 200 is configured to provide a security service for a client system, such as client system 205, or a network with which the client system is associated (e.g., a security service customer's enterprise network). According to various embodiments, system 200 is configured to mediate DNS traffic. System 200 can handle the DNS traffic based at least in part on a DNS traffic classifications (e.g., classifications for the DNS records such as in connection with determining whether the DNS records or corresponding domain is malicious, the DNS records are hijacked, etc.) for the DNS records associated with the intercepted DNS traffic (e.g., the DNS records associated with intercepted DNS responses). In some embodiments, system 200 is configured to provide inline detection of malicious DNS traffic (e.g., DNS responses corresponding to malicious domains or malicious/hijacked DNS records). For example, system 200 implements an inline security entity comprising a local cache (e.g., an ADNS cache) that stores a set of DNS traffic classifications (e.g., pre-computed DNS classifications for previously observed domains/records or for a set of monitored domains/records, such as popular domains). The set of DNS traffic classifications may comprise a set of DNS record classifications.

System 200 (e.g., firewall 210) may query a security service (e.g., a cloud security platform) for a real-time DNS traffic classification (e.g., a classification of the DNS response or information comprised in the DNS response), such as in response to determining that a DNS traffic classification for the corresponding domain/record is not stored in the local cache.

In the example shown, system 200 comprises one or more of a client system 205, a security entity (e.g., firewall 210), and/or security service 215.

System 200 comprises a detection pipeline that can detect malicious traffic, such as by classifying internet or application traffic, files transmitted across (e.g., to/from) the network, or DNS traffic. System 200 can use a security entity, such as firewall 210, to provide inline detection. For example, firewall 210 can intercept network traffic and perform an inline classification, such as by using a light weight classifier (e.g., a machine learning model) or by comparing an identifier for the traffic (e.g., a hash computed for the traffic such as a hash of the file, a hash of the header, etc.) to a whitelist or blacklist provided to the firewall 210 by security service 215. In some embodiments, firewall 210 implements inline detection/classification of DNS traffic based on querying an ADNS response cache (e.g., a cache local to firewall 210), which can store a set of predefined/precomputed DNS traffic classifications. Firewall 210 can also provide a real-time detection by querying security service 215 to provide a classification for the network traffic (e.g., the file, internet or application traffic, or DNS traffic). In connection with providing the real-time detection, firewall 210 queries the security service 215 contemporaneous with the handing of the traffic being classified. For example, firewall 210 can query the security service 215 and receive a response (e.g., the classification) within 100 ms of firewall 210 intercepting the traffic.

The following description of system 200 is provided in the context of DNS traffic and system 200 providing security service with respect to DNS traffic.

As an illustrative example, system 200 uses an offline detection pipeline to perform DNS record classification offline and store the DNS classifications in a dataset, for example, a set of detected DNS hijacked records. The malicious DNS records can be stored in a dataset that can be queried for future classifications, or can be used to generate a whitelist and/or blacklist of DNS records or domains that can be used for a lightweight/quick detection, such as inline by firewall 210. Security service 215, or another offline detection pipeline used to populate a dataset of malicious DNS records, collects records (e.g., via interception of DNS traffic, such as by firewall 210) that were observed over a predetermined time period and the DNS information (e.g., DNS records) is processed offline to determine the corresponding DNS record classifications. The predetermined period of time over which records are collected is generally a period that does not lend itself to real-time DNS traffic detection (e.g., detection of hijacked DNS records or DNS traffic for malicious domains, etc.). During processing of the collected DNS records (e.g., the DNS records observed over the previous day, or a set of monitored records, such as for a predefined list of popular domains), the offline detection pipeline obtains data to be used for the DNS traffic classifications (e.g., pen's data, geolocation data, subnet history data, web crawled data, reputational data, etc.) and precomputes the DNS traffic classification (e.g. the DNS record classifications). The offline detection pipeline stores the detected domains or DNS records (e.g., DNS records classified as malicious DNS records, or domains for which corresponding DNS traffic is classified as malicious) in a datastore, such as a datastore comprising the dataset of malicious DNS records dataset. The DNS records dataset is then used later by firewall 210 (e.g., via security service 215) to block DNS traffic (e.g., DNS responses) that contain malicious DNS records or are associated with malicious domains, etc.

At 252, firewall 210 obtains a DNS request from a client system 205 (e.g., a customer's systems). Firewall 210 may intercept the DNS request during the handling or mediating traffic to/from the client system 205. In response to obtaining the DNS request, firewall 210 sends the DNS request to security service 215, such as in connection with querying security service 215 for an indication of whether the DNS request is to be allowed. Security service 215 can determine whether the DNS request is to be allowed, such as based on querying an allow list or a historical dataset of classified domains or records (e.g., a malicious DNS records dataset). If security service 215 determines that the DNS request is to be allowed, at 256, security service 215 provides to firewall 210 an indication that the DNS request is allowed (otherwise, security service 215 can provide an indication that the DNS request is to be disallowed). In response to receiving an indication that the DNS request is not to be allowed (e.g., is to be disallowed), firewall 210 can correspondingly apply a security policy with respect to the DNS request, such as to block or quarantine the DNS request. Conversely, in response to receiving an indication that the DNS request is to be allowed, at 258, firewall 210 queries a DNS service 220 (e.g., a third party service) for a DNS response (e.g., for the information to resolve the domain comprised in the DNS request). At 260, firewall 210 obtains the DNS response from DNS service 220. Before providing the DNS response to client system 205, firewall 210 determines whether the DNS response is to be provided to client system 205. Firewall 210 can determine whether the DNS response is to be provided to client system 205 based at least in part on an ADNS cache and/or a classification or decision provided by query security service 215. Firewall 210 can store an ADNS cache locally and in response to receiving the DNS response from DNS service 220 queries the ADNS cache to determine whether a classification for the DNS response (or the associated domain) is stored as a record in the ADNS cache. Alternatively, the ADNS cache can store a whitelist of domains or DNS responses deemed benign and/or a blacklist of domains or DNS responses deemed malicious. If the ADNS cache stores a record for the domain or other information comprised in the DNS response, firewall 210 can use the cached classification to determine whether to provide the DNS response to client system 205. If the ADNS cache stores a local classification, firewall 210 can handle the DNS response without executing 262 and 264. In response to determining that the ADNS cache does not store a record for the domain or other information comprised in the DNS response, firewall 210 can query security service 215 for an indication of whether the DNS response is to be allowed. At 262, firewall 210 provides the DNS response to security service 215. In response to receiving the DNS response, security service 215 can query a dataset of precomputed classifications (e.g., DNS record classifications such as in connection with handling previous DNS traffic for the DNS record). Security service 215 determines whether the DNS response should be allowed or disallowed based on the historical classifications (e.g., the data set of DNS hijacked records). In response to determining that the DNS response is to be disallowed (e.g., based on determining that the record was previously classified as a DNS hijacked record), security service 215 can provide an indication to firewall 210 that DNS response is to be disallowed and firewall 210 correspondingly applies a security policy, such as to block or quarantine the DNS response. In response to determining that the DNS response is to be allowed, at 264, security service 215 provides to firewall 210 the indication that the DNS request is to be allowed. In response to firewall 210 receiving an indication that the DNS response is allowed (e.g., that the corresponding record is not a DNS hijacked record), at 266, firewall 210 provides the DNS response to client system 205.

Figure 3:
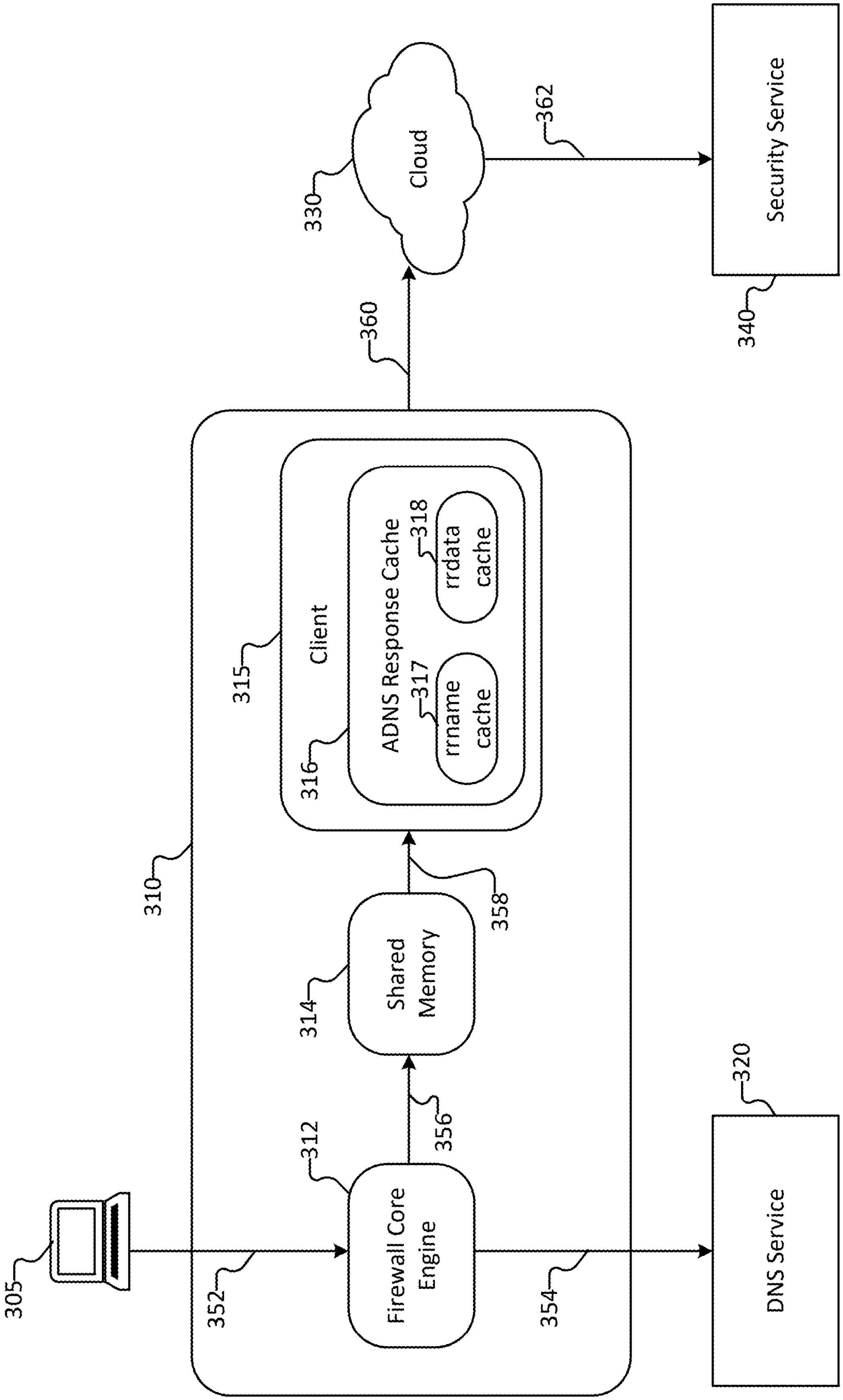
FIG. 3 is an illustration of a system for caching DNS traffic classifications according to various embodiments.

FIG. 3 is an illustration of a system for caching and reporting DNS telemetry data according to various embodiments. In some embodiments, system 300 implements at least part of system 100 of FIG. 1 and/or system 200 of FIG. 2. In some embodiments, system 300 is implemented at least in part by FIG. 4. System 300 can implement one or more of processes 600-800 of FIGS. 6-8.

System 300 is configured to provide a security service for a client system, such as client system 305, or a network with which the client system is associated (e.g., a security service customer's enterprise network). According to various embodiments, system 300 is configured to provide DNS record classifications and to cache at least a subset of the DNS record classifications in an ADNS cache to facilitate quick queries and to enable security entities (e.g., firewall 310) to make local determinations on how to handle DNS traffic (e.g., DNS responses). For example, system 300 is configured to store the ADNS cache(s) locally at one or more security entities handling DNS traffic to allow the security entities to respectively query their local ADNS cache for precomputed DNS traffic classifications (e.g., DNS record classifications, or domain classifications, etc.). System 300 may manage the ADNS cache(s), such as to update the records stored locally at the ADNS cache. The ADNS cache may be updated based on information (e.g., new ADNS cache records, or classifications, etc.) received from security service 340.

In the example shown, system 300 comprises firewall 310. System 300 may additionally comprise, or interface with, client system 205, DNS service 320, and/or a security service 340 (e.g., via cloud 330). According to various embodiments, firewall 310 comprises ADNS response cache 316. System 300 (e.g., firewall 310) uses ADNS response cache 316 to cache DNS traffic classifications (e.g., DNS response classifications, domain classifications, etc.) obtained by firewall 310, such as based at least in part on updates received from security service 340 or real-time classifications performed/provided by security service 340 (which can be cached for a predefined period of time at the ADNS response cache 316).

According to various embodiments, the ADNS response cache 316 comprises a first cache (e.g., an rrname cache index based on rrname information) and a second cache (e.g., an raita cache indexed based on raita information). In the example shown, the rrname cache is denoted by first cache 317 and the raita cache is denoted by second cache 318.

In some embodiments, firewall 310 additionally comprises one or more of firewall core engine 312 and shared memory 314.

At 352, firewall 310 obtains a DNS request from a client system 305 (e.g., a customer's systems). Firewall 310 may intercept the DNS request during the handling or mediating traffic to/from the client system 305. For example, firewall core engine 312 intercepts the DNS traffic (e.g., a DNS query) from client system 305 to DNS service 320.

In response to obtaining (e.g., intercepting) the DNS request, at 354, firewall 310 (e.g., via firewall core engine 312) queries a DNS service 320 (e.g., a third party service) for a DNS response (e.g., for the information to resolve the domain comprised in the DNS request). Firewall 310 further obtains the DNS response from DNS service 320.

At 356, in response to receiving a DNS response from DNS service 320, firewall 310 stores the DNS traffic information (e.g., the DNS response) in shared memory 314. At 358, firewall 310 provides the DNS response to client 315 running on firewall 310. For example, client 315 may access shared memory 314 and retrieve DNS traffic information (e.g., DNS responses) for which client 315 is determine the manner for handling the corresponding DNS traffic. Client 315 determines how to handle the corresponding DNS traffic, such as whether to forward the DNS response to client system 305, or whether to block or discard the associated DNS traffic, etc. in connection with determining how to handle the DNS traffic, client 315 may query ADNS response cache 316, which can be stored locally at firewall 310. In response to determining that ADNS response cache 316 stores a record corresponding to the DNS record received from DNS service 320, firewall 310 (e.g., client 315) can determine how to handle the DNS traffic based on the classification stored in the ADNS response cache 316. Conversely, if client 315 determines that ADNS response cache 316 does not store a record for the DNS record, at 316, client 315 can query security service 340 for a classification or determination on how to handle the corresponding DNS traffic. For example, client system 305 can query security service 340 via accessing security service 340 via the cloud 330 at 360 and 362.

According to various embodiments, the system comprises a configuration interface via which the ADNS response cache 316 or the collection or handling of DNS traffic classifications can be configured. Examples of configurations for the ADNS response cache 316 or the collection or handling of DNS traffic classifications include: (a) setting the time for which ADNS response records are valid, (b) setting the maximum number of cache entries in the ADNS response cache (e.g., to configure the size of the ADNS response cache or memory allocated for the ADNS response cache), (c) to show/report a counter, (d) to show/report statistics pertaining to the ADNS response cache (e.g., statistics of the number/percentage of hits to the ADNS response cache based on intercepted DNS responses), (e) to provide (e.g., print, display, etc.) a debug log, (f) to stop/start the writing of records to the ADNS response cache (e.g., to stop/start the caching of DNS telemetry data), (g) to debug the current ADNS response cache, (h) to clear the ADNS response cache, (I) to clear statistics pertaining to the ADNS response cache, and/or (j) to configure caches comprised in the ADNS response cache, such as first cache 317 (e.g., rrname cache) and/or second cache 318 (e.g., rrdata cache). In some embodiments, the configuration interface enables the system (e.g., a user via a client system) to query the ADNS telemetry cache, such as to identify information for a particular domain.

According to various embodiments, ADNS response cache 316 stores one or more different types of caches according to which DNS records or domains are cached. In some embodiments, different types of caches comprised in ADNS response cache 316 can be queried for a classification according to a type of DNS record associated with the DNS response for which ADNS response cache 316 is being queried. A cache comprised in the ADNS response cache 316 can index the data according to a particular piece of information associated with a DNS response (e.g., the rrname, the raita, etc.). Additionally, a cache comprised in the ADNS response cache 316 can implement a different caching technique. Examples of caching techniques that can be implemented include a hash table caching technique, a HAT trie caching technique, etc. Various other types of caching techniques may be implemented.

Figure 4:
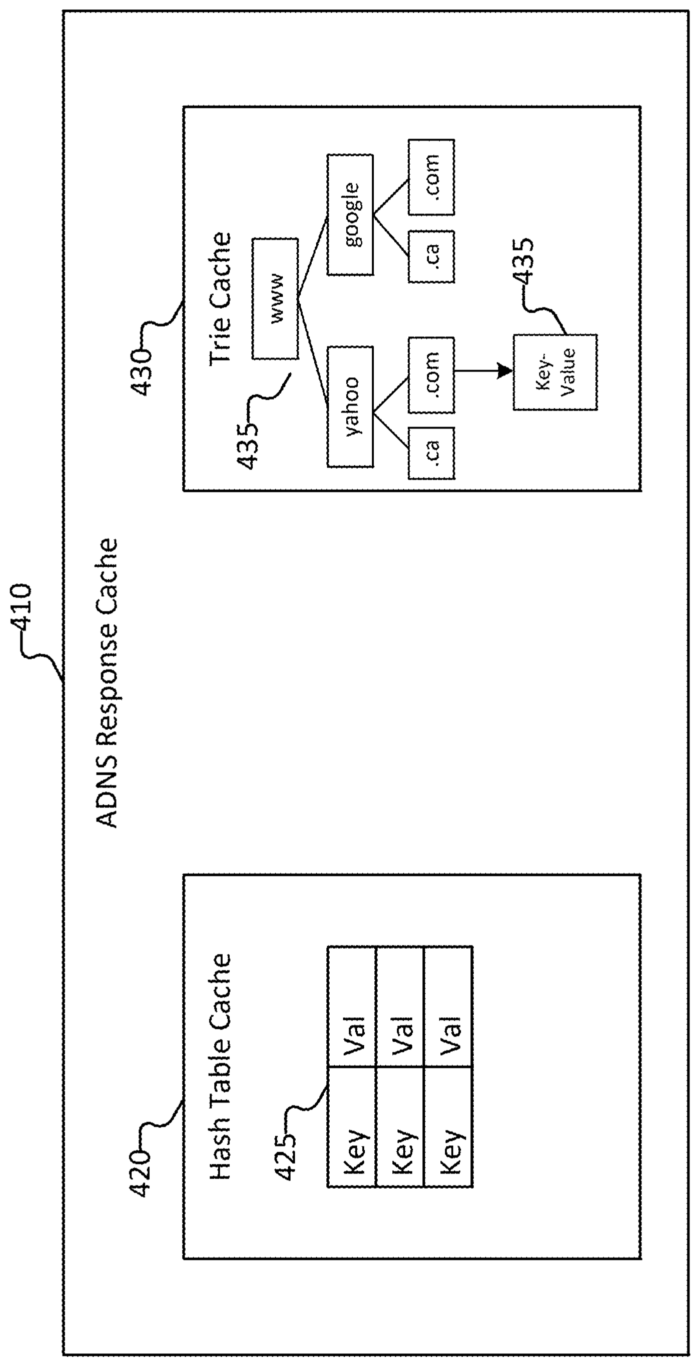
FIG. 4 is an illustration of an advance domain name system (ADNS) telemetry cache according to various embodiments.

In the example shown, ADNS response cache 316 comprises first cache 317 and second cache 318. However, various other numbers and/or types of caches can be stored in ADNS response cache 316. An example of the ADNS response cache 316 is illustrated in FIG. 4.

According to various embodiments, ADNS response cache 316 implements (e.g., comprises) a hash table cache. The hash table cache can be implemented for one or more of an A type of DNS record and/or an AAAA type of DNS record. The hash table cache stores verdicts (e.g., DNS traffic classifications) for a set of resource records. The hash table cache may implement a key-value pairings, where they key corresponds to information obtained from the raita, such as the IP address, and the value corresponds to information obtained from the raita, such as the domain. According to various embodiments, the value field may be configured to support storing prefix match entries or wildcards, such as a small linked list from an entry in the hash table cache of the ADNS cache.

According to various embodiments, because a large percentage of DNS responses belong to A/AAAA type categories and IPs are always exact matches, ADNS response cache 316 is configured to separate out these signatures (e.g., as compared to other types of categories) and store them as a hash for efficient lookup. In some embodiments, the system implements the hash table cache index according to the IP address (e.g., the key is the IP address obtained from the raita), such through the use of storing the hash table cache as rrdata cache 318. The value field in the hash table cache stores one or more of the Retyped, a DNS category, a threat identifier (id), a threat name, an expiry time (e.g., an time/date on which the cached DNS traffic classification expires or is no longer deemed valid), and other metadata along with the rrname. In some embodiments, the ADNS response cache 316 is queried (e.g., for A type or AAAA type DNS records) to find a match for a particular DNS traffic sample by querying a hash table cache (e.g., performing a hash lookup) to find a match based on the raita (e.g., the IP address) and then querying another cache (e.g., a HAT trie cache) in the ADNS cache based on information obtained from the value field in the corresponding entry stored in the hash table cache (e.g., the rrname from the value struct) to determine whether the ADNS cache stores a complete match for the DNS traffic sample. As an example, the HAT trie cache can be implemented as first cache 317 (e.g., rrname cache).

According to various embodiments, ADNS response cache 316 implements (e.g., comprises) a HAT trie cache. ADNS response cache 316 may store one or more HAT trie caches that index DNS records or domains data based on different DNS record data. In some embodiments, the HAT trie cache configures (e.g., determines) a first HAT trie cache indexed according to rrname (e.g., the domain name) and a second HAT trie cache indexed according to raita (e.g., the IP address).

In some embodiments, the first HAT trie cache indexed according to rrname can be used in connection with querying the ADNS cache for a domain verdict (e.g., a DNS traffic classification based on the domain) for the following types of DNS records: (a) an A type DNS record, (b) an AAAA type DNS record, (c) an MX type DNS record, (d) an NS type DNS record, (e) a CAME type DNS record, (f) a PTR type DNS record, (h) an SOA type DNS record, (I) an SRV type DNS record, and (j) a TXT type DNS record).

In some embodiments, the second HAT trie cache indexed according to raita can be used in connection with querying the ADNS cache for a resource record verdict (e.g., a DNS traffic classification based on the resource record) and/or a domain verdict (e.g., a DNS traffic classification based on the domain). The second HAT trie cache can be queried for (e.g., support) one or more of the following types of DNS records: (a) an MX type DNS record, (b) an NS type DNS record, (c) a CAME type DNS record, (d) a PTR type DNS record, and (e) an SOA type DNS record.

FIG. 4 is an illustration of an advance domain name system (ADNS) telemetry cache according to various embodiments. ADNS cache 400 may be implemented by system 100 of FIG. 1, system 200 of FIG. 2, and/or system 300 of FIG. 3.

According to various embodiments, ADNS response cache 410 may store a plurality of different caches that implement different caching techniques. In the example shown, ADNS comprises a hash table cache 420 and a HAT trie cache 430. Hash table cache 420 comprises a hash table 425 comprising a set of records indexed according to key-value pairs. HAT trie cache 430 stores a HAT trie 435 comprising a set of records indexed using a HAT trie technique. The HAT trie technique is further described in Nikolas Askitis and Ranjan Sinha. 2007. HAT-trie: a cache-conscious trie based data structure for strings. In Proceedings of the thirtieth Australasian conference on Computer science-Volume 62 (ACSC '07), Vol. 62. Australian Computer Society, Inc., AUS, 97-105, the entirety of which is hereby incorporated by reference for all purposes. The HAT trie cache according to various embodiments described herein may be implemented using the technique disclosed in the foregoing publication.

In some embodiments, the ANS cache (e.g., ADNS response cache 410) implements a cache (e.g., hash table cache 420) that is structured as a hash table (e.g., hash table 425), where the resource record data (raita), such as IP addresses, is used as a key to index DNS traffic classifications. Specifically, the hash table 425 may be implemented as a for cache Type A (IPv4) or Type AAAA (IPv6) DNS records, allowing for efficient lookup and retrieval of DNS traffic classifications based on the IP addresses returned in DNS responses.

Additionally, in other embodiments, the local ADNS cache (e.g., ADNS response cache 410) may implement a cache that is structured as a Hybrid Associative Trie (HAT trie), which is well-suited for situations where the cache needs to store domain names efficiently. The HAT trie cache allows DNS traffic classifications to be indexed using the domain name associated with a particular DNS record. In these cases, the domain name (or domain portion of a DNS query) is used as the key, and the associated DNS traffic classification is stored as the value in the trie structure. The HAT trie cache can also store the following in the value field: rrtype data, a DNS category, a threat identifier, a threat name, a time to live data, a match criteria (e.g., an exact or suffix match, or wildcard, etc.), etc.

A HAT trie (Hybrid Associative Trie) is a data structure that combines elements of both hash tables and tries (prefix trees), offering the benefits of fast lookups and efficient storage for variable-length strings like domain names or IP addresses. Unlike standard tries, which store data in a tree-like structure where each node represents part of a string, the HAT trie incorporates hash table-like properties, making it more compact and faster at handling large datasets.

In a HAT trie, nodes represent portions of a string, such as characters in a domain name, allowing multiple strings with common prefixes (like example.com and example.org) to share the same path. This reduces storage redundancy and makes the structure more memory-efficient. At the same time, each node is associated with an array or map that holds values, such as DNS traffic classifications. The hybrid nature of the HAT trie means it can store large sets of strings, such as domain names or IP addresses, while maintaining quick look up and insertion capabilities.

In the context of caching DNS traffic classifications within a security entity like an inline firewall, a HAT trie can be used to store domain names or IP addresses as keys, with the corresponding DNS traffic classifications stored as values. For example, when a DNS query is processed, the security entity can check the local cache, which uses a HAT trie to store the domain name (like malicious.com) as the key. The HAT trie will quickly return the associated classification (if any), such as "malicious," allowing the security entity (e.g., the firewall) to enforce the appropriate security policy (e.g., blocking the traffic).

The HAT trie can also be used to cache DNS records indexed by resource record data (RRdata), such as IP addresses, particularly for Type A or Type AAAA DNS records. In this case, the IP address serves as the key, and the value could be the classification of the DNS response (e.g., "benign" or "malicious"). For instance, an IP address like 192.168.1.1 could be indexed in the trie, and the firewall could use this information to quickly determine whether traffic associated with that address should be allowed or blocked.

One of the key advantages of the HAT trie is its ability to compress common prefixes, making it ideal for storing and querying domain names that share parts of their strings. For example, domain names like example.com and example.net will share a common path in the trie, significantly reducing storage overhead. This structure is also highly efficient for handling DNS traffic in environments with large volumes of queries, as it allows the security entity to perform real-time lookups without the delays that might occur with other caching mechanisms.

The HAT trie is particularly useful in scenarios where the local DNS cache needs to be updated frequently. When a new DNS classification is obtained from a cloud-based service, it can be quickly inserted into the HAT trie. This allows future DNS queries for the same domain or IP address to be classified locally without needing to repeatedly query the cloud service, thus improving the performance and scalability of the system.

Unlike a traditional hash table, the HAT trie provides flexibility in how it manages different types of DNS records. It can efficiently handle both domain name-based queries (where the key is a domain name) and IP-based queries (where the key is the RRdata, or IP address). This allows the security entity to classify and handle different types of DNS traffic based on either the domain name or the IP address in the DNS response, making it a versatile tool for DNS traffic classification and security enforcement.

The HAT trie provides a compact and efficient way of storing and querying domain names, particularly for high-performance scenarios involving large volumes of DNS data. It combines the fast access times of a hash table with the ordered structure of a trie, making it ideal for storing variable-length domain names. For example, in the case of Type A or Type AAAA DNS records, the advanced DNS cache uses the HAT trie to store DNS classifications, where the domain name serves as the key, and the classification (whether malicious or benign) is the stored value. This enables quick lookups based on domain names, allowing the security entity to efficiently determine the status of DNS traffic related to a given domain.

In some embodiments, the system (e.g., an ADNS cache) implements a HAT trie cache that uses raita as a key, where the IP address is the indexed element, and the value is the domain name or associated DNS traffic classification. This flexible indexing mechanism allows the advanced DNS cache to support multiple lookup methods, ensuring that both domain-based and IP-based queries can be efficiently handled depending on the context of the DNS traffic.

In some embodiments, the system stores the HAT trie cache so that the HAT trie cache is split into shards. In addition, the system can implement read-write locks for the HAT trie cache so that multiple readers can access entries in the HAT trie cache.

Figure 5:
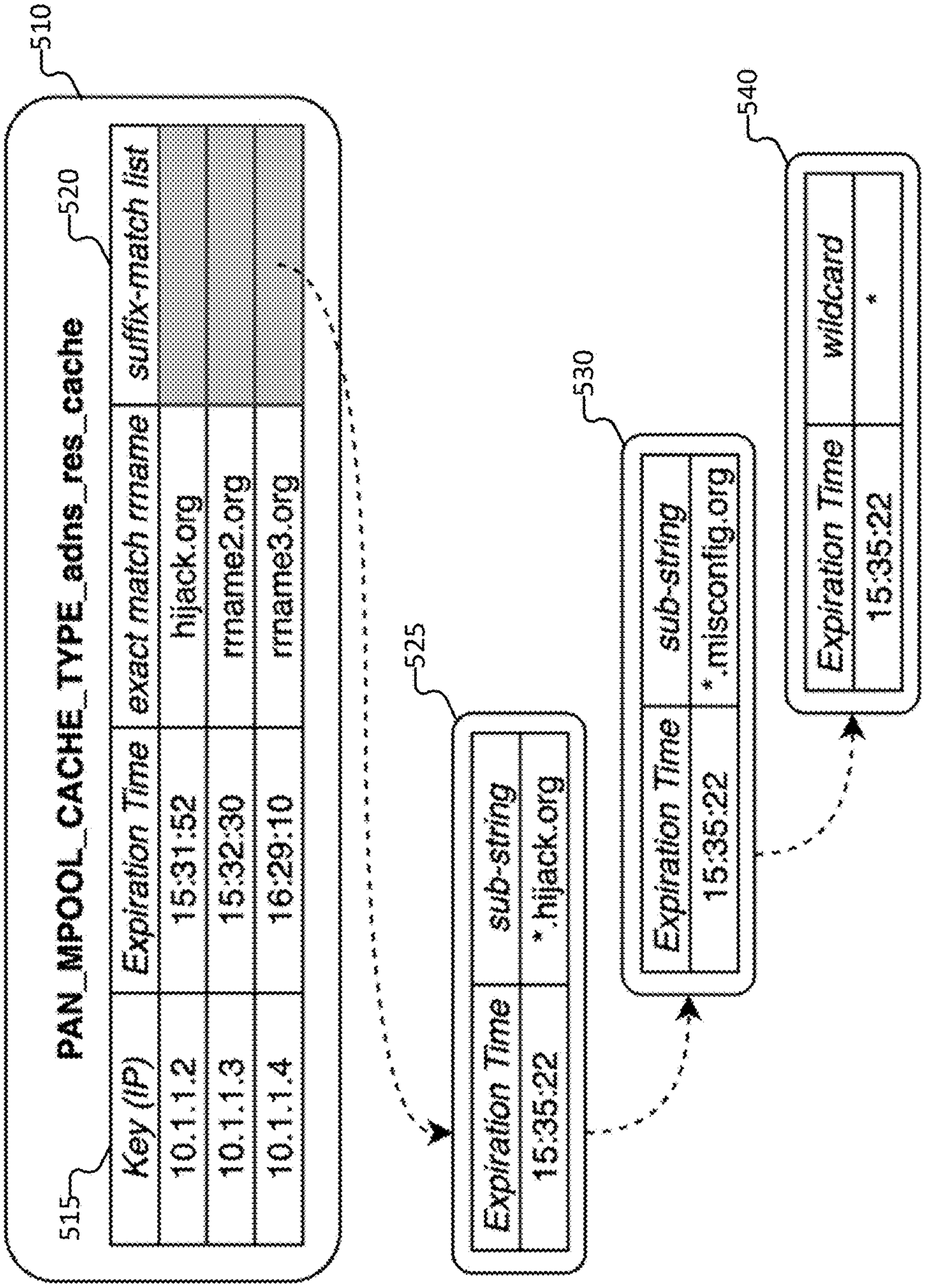
FIG. 5 is an illustration of a hash table cache storing cached DNS traffic classifications according to various embodiments.

FIG. 5 is an illustration of a hash table cache storing cached DNS traffic classifications according to various embodiments. In some embodiments, ADNS cache 500 is implemented at least in part by system 100 of FIG. 1, system 200 of FIG. 2, and/or system 300 of FIG. 3, and/or ADNS cache 400 (e.g., hash table cache 420 of FIG. 4).

In the example shown, ADNS cache 500 comprises hash table cache 510. As illustrated, hash table cache 510 comprises a key field 515. In the illustrated example, the key field indexes records according to IP addresses. Hash table cache 510 can store a classification (e.g., a DNS traffic classification, or a DNS record classification, etc.) in association with the key field, for example, the classification can be stored as the value in the key-value pair stored in hash table cache 510. Hash table cache 510 may additionally store other metadata associated with the cache record (e.g., the classification stored in the hash table). In the example shown, hash table cache 510 comprises metadata such as an expiration time, an exact match rrname, and a suffix-match list (e.g., in suffix-match list field 520). The expiration time may be the time at which the cache record is no longer valid (e.g., the time at which the stored classification is no longer valid) or a time period when the cache record expires. The exact match rrname stores the rrname data obtained from the corresponding DNS record.

In some embodiments, the hash table cache 510 stores a link list of other DNS responses that match the key. The suffix-match list field 520 of hash table cache 510 stores a head of the link list, or a pointer to the head of the link list. In the example shown, the head link list is shown as link list entry 525 corresponding to a wild card (e.g., *hijack.org) of the rrname data in the hash table cache 510 in the exact match rrname field (e.g., hijack.org). In some embodiments, the system allocates space in the hash table cache 510 for the head of the link list (e.g., the entry in the suffix-match list field 520). Each subsequent link list entry can point to a next link list in the entry. For example, link list entry 525 can point to a second link list entry 530, which can subsequently point to a third link list entry 540. Each entry in the link list can have a corresponding expiration time. The system can allocate memory for the link list on demand, such as each subsequent entry in the link list. In some embodiments, the system can limit a number of entries in the link list for each record in the hash table cache 510 to a predefined number records (e.g., five records, etc.).

Figure 6:
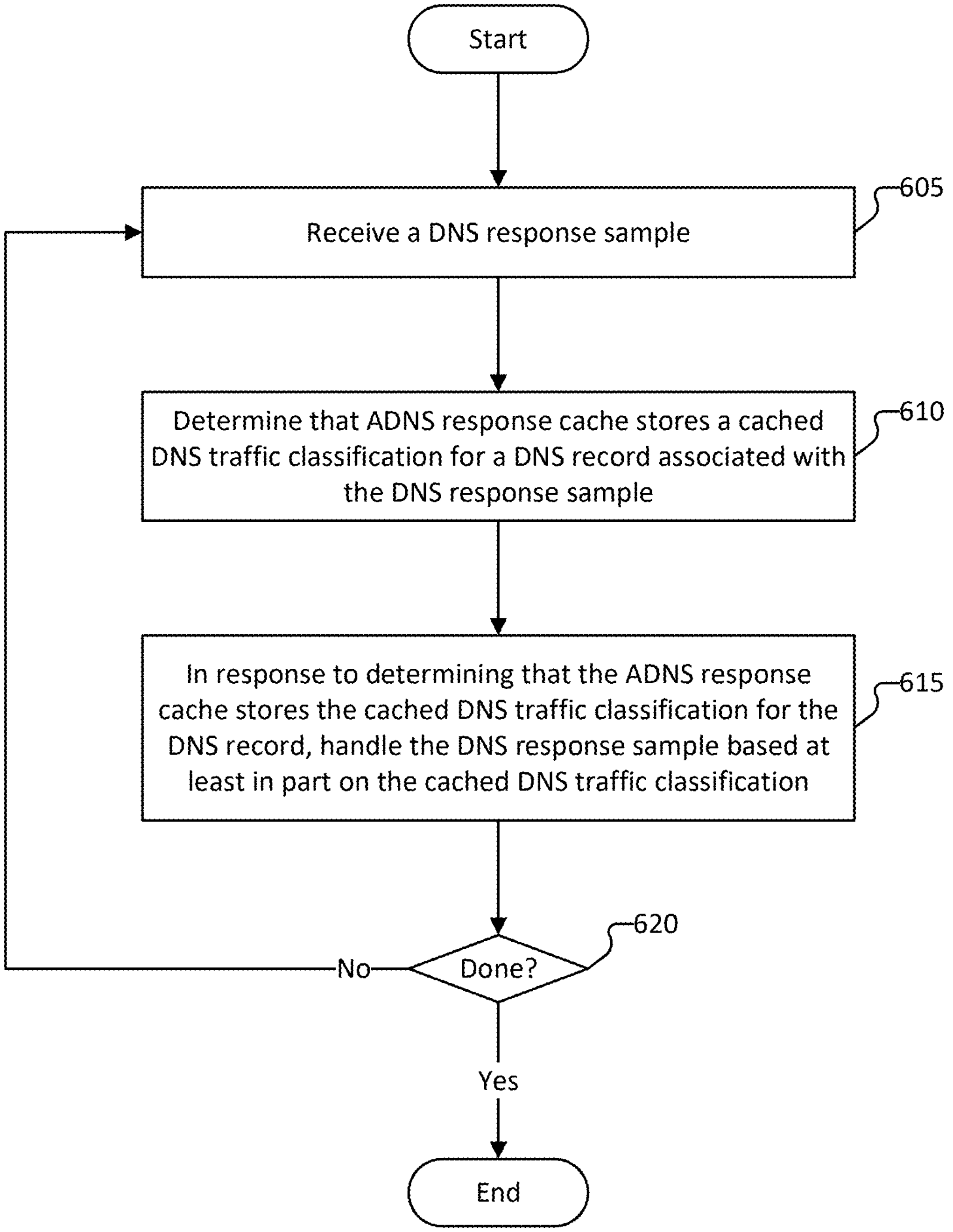
FIG. 6 is a flow diagram of a method for handling DNS traffic based at least in part on a ADNS telemetry cache according to various embodiments.

FIG. 6 is a flow diagram of a method for handling DNS traffic based at least in part on a ADNS telemetry cache according to various embodiments. In some embodiments, process 600 is implemented at least in part by system 100 of FIG. 1, system 200 of FIG. 2, and/or system 300 of FIG. 3. Process 600 may be implemented by a system providing security service to an inline security entity, such as to a firewall (e.g., a next generation firewall).

In some embodiments, process 600 is invoked by a security entity in connection with the interception of DNS traffic and/or the handling of DNS traffic. The security entity may implement an ADNS cache, such as the ADNS caches described in connection with system 100 of FIG. 1, system 200 of FIG. 2, system 300 of FIG. 3, ADNS cache 400 of FIG. 4, and/or ADNS cache 500 of FIG. 5.

At 605, the system receives a DNS response sample. For example, the system obtains (e.g., extracts) the DNS response sample from DNS traffic, such as intercepted DNS traffic for which the system is determining how to handle (e.g., for which the system is enforcing one or more pre-defined security policies). At 610, the system determines that the ADNS response cache stores a cached DNS traffic classification for a DNS record associated with the DNS response sample. As an example, the system queries the ADNS cache for an entry (e.g., a DNS traffic classification) for the DNS record associated with the DNS response sample (e.g., the DNS record extracted from the DNS response sample, etc.). At 615, in response to determining that the ADNS response cache stores the cached DNS traffic classification for the DNS record, the system handles the DNS response sample based at least in part on the cached DNS traffic classification. In some embodiments, if the system determines that the ADNS response cache does not comprise an entry (e.g., a DNS traffic classification) for the DNS response sample (e.g., for the DNS record associated with the DNS response sample), the system can query a security service for a real-time classification. The security service may be implemented by a cloud security service that the security entity can query for a real-time classification. According to various embodiments, the security entity is configured to fail-open. For example, in response to determining that ADNS cache does not store an entry (e.g., a cached DNS traffic classification), the security entity queries the cloud security service for a real-time classification. However, if the security entity does not receive the real-time DNS traffic classification from the cloud security service within a predefined period of time (e.g., 100 ms, or another configurable time threshold), then the security entity handles the corresponding DNS traffic as benign, for example, to avoid an unacceptable latency or quality of service. Otherwise, if the security receives the real-time DNS traffic classification within the predefined period of time, the security entity can handle the corresponding DNS traffic classification based on the real-time DNS traffic classification (e.g., the security entity enforces a security policy based on the real-time DNS traffic classification). At 620, a determination is made as to whether process 600 is complete. In some embodiments, process 600 is determined to be complete in response to a determination that no further DNS traffic is to be handled, no further DNS responses are received, no further DNS responses are to be evaluated, no further DNS responses extracted from intercepted DNS traffic has a corresponding entry in the ADNS cache, an administrator indicates that process 600 is to be paused or stopped, etc. In response to a determination that process 600 is complete, process 600 ends. In response to a determination that process 600 is not complete, process 600 returns to 605.

Figure 7:
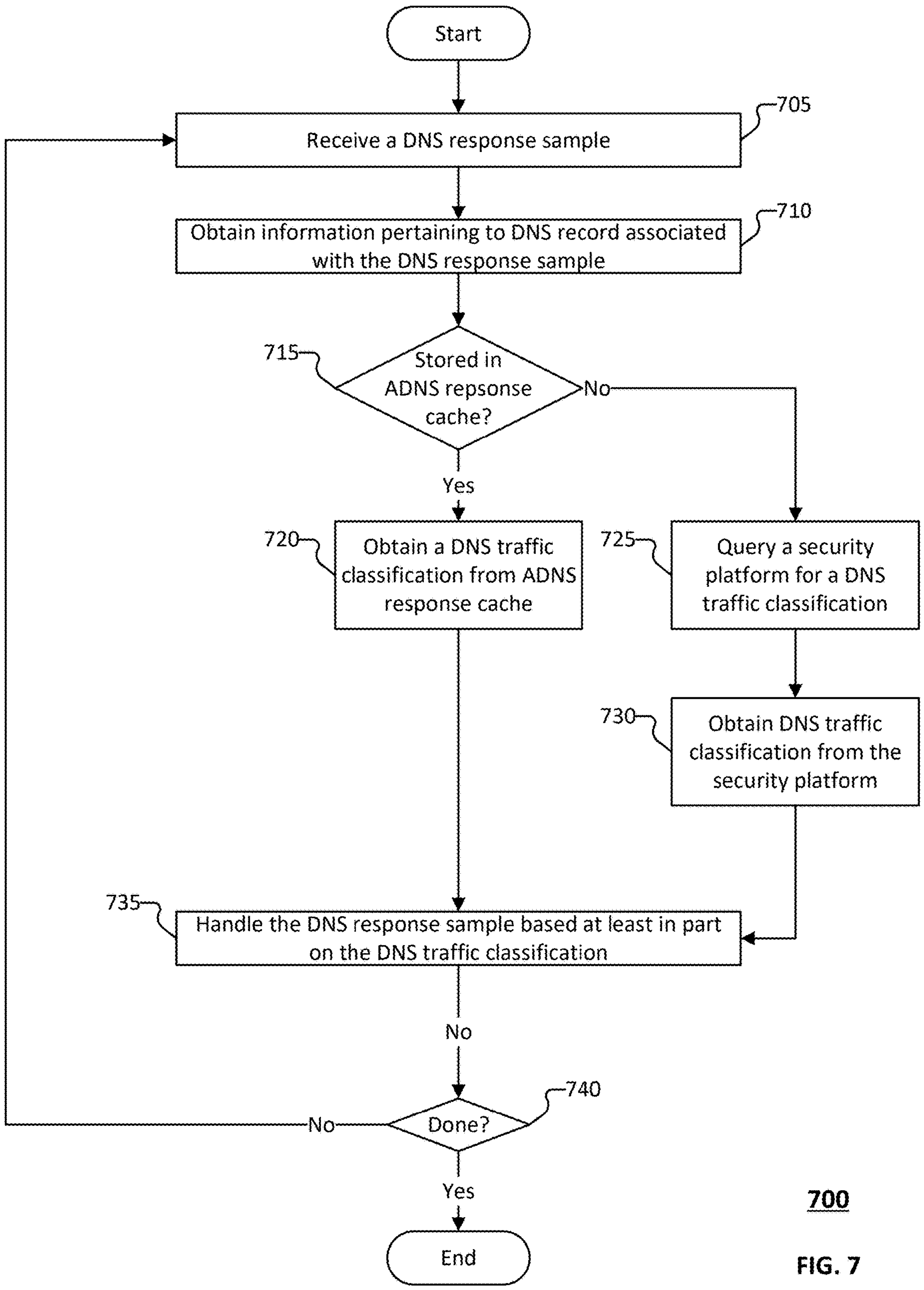
FIG. 7 is a flow diagram of a method for handling DNS traffic based at least in part on a ADNS telemetry cache according to various embodiments.

FIG. 7 is a flow diagram of a method for handling DNS traffic based at least in part on a ADNS telemetry cache according to various embodiments. In some embodiments, process 700 is implemented at least in part by system 100 of FIG. 1, system 200 of FIG. 2, and/or system 300 of FIG. 3. Process 700 may be implemented by a system providing security service to an inline security entity, such as to a firewall (e.g., a next generation firewall).

In some embodiments, process 700 is invoked by a security entity in connection with the interception of DNS traffic and/or the handling of DNS traffic. The security entity may implement an ADNS cache, such as the ADNS caches described in connection with system 100 of FIG. 1, system 200 of FIG. 2, system 300 of FIG. 3, ADNS cache 400 of FIG. 4, and/or ADNS cache 500 of FIG. 5.

At 705, the system receives a DNS response sample. 705 may be similar to or the same as 605 of process 600. At 710, the system obtains information pertaining to a DNS record associated with the DNS response sample. At 715, the system determines whether the ADNS response cache comprises the DNS record or a cached DNS traffic classification for the DNS response (e.g., for the DNS record). In some embodiments, the system determines whether the ADNS response cache comprises the DNS record or a cached DNS traffic classification for the DNS response based at least in part on querying the ADNS response cache. In some embodiments, 715 comprises invoking process 800 of FIG. 8. In response to determining that the ADNS response cache comprises the DNS record or a cached DNS traffic classification for the DNS response, process proceeds to 720 at which the system obtains a DNS traffic classification from the ADNS response cache (e.g., the system obtains the cached DNS traffic classification). Conversely, in response to determining that the ADNS response cache comprises the DNS record or a cached DNS traffic classification for the DNS response, process 700 proceeds to 725 at which the system queries a security platform (e.g., a cloud security service) for a DNS traffic classification. As an example, the system queries the security platform for a real-time DNS traffic classification. At 730, the system obtains the DNS traffic classification (e.g., the real-time DNS traffic classification) from the security platform. At 735, the system handles the DNS response sample (e.g., the corresponding DNS traffic) based at least in part on the DNS traffic classification. At 740, a determination is made as to whether process 700 is complete. In some embodiments, process 700 is determined to be complete in response to a determination that no further DNS traffic is to be handled, no further DNS responses are received, no further DNS responses are to be evaluated, no further DNS responses extracted from intercepted DNS traffic has a corresponding entry in the ADNS cache, an administrator indicates that process 700 is to be paused or stopped, etc. In response to a determination that process 700 is complete, process 700 ends. In response to a determination that process 700 is not complete, process 700 returns to 705.

Figure 8:
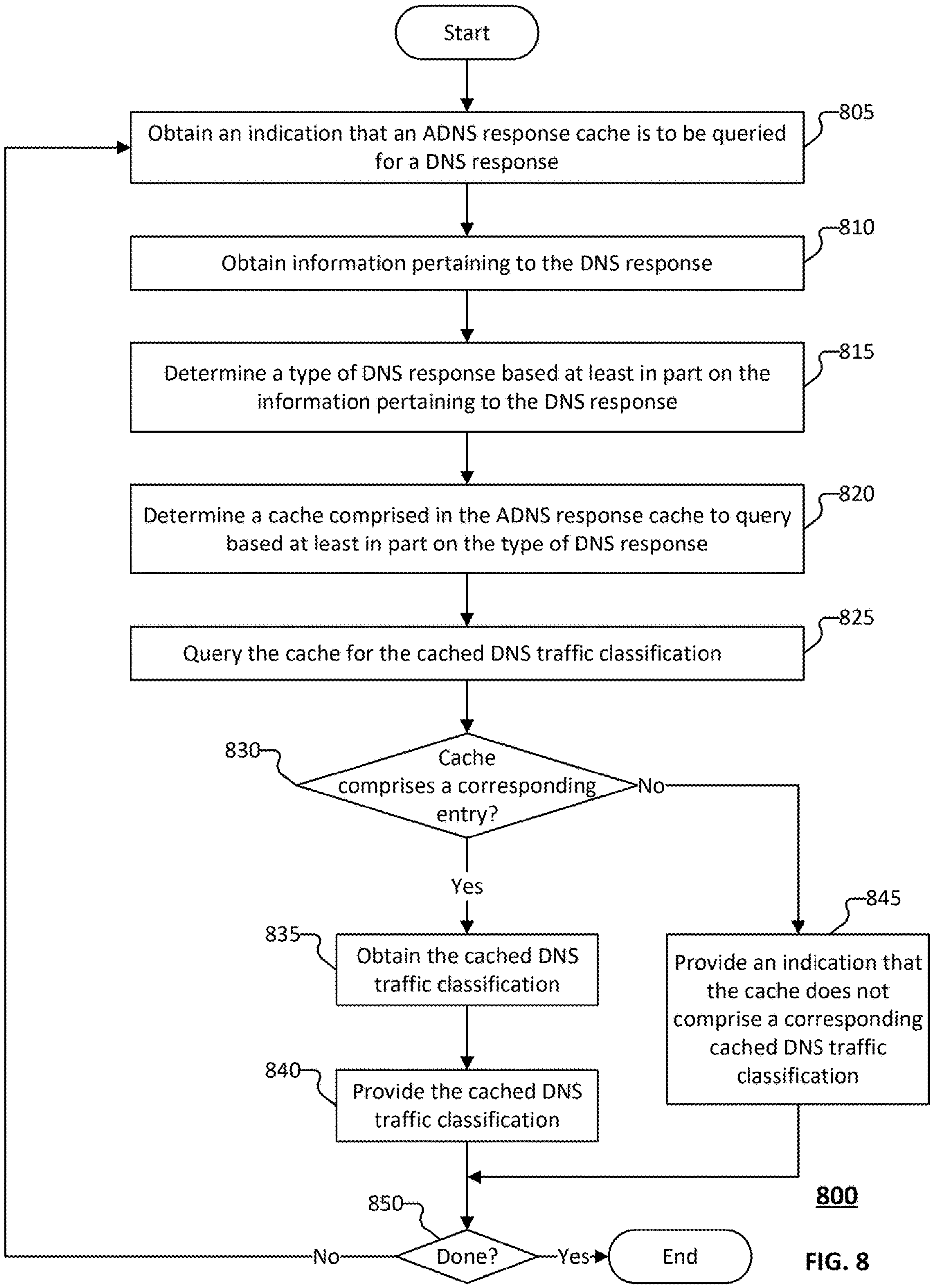
FIG. 8 is a flow diagram of a method for obtaining a DNS traffic classification according to various embodiments.

FIG. 8 is a flow diagram of a method for obtaining a DNS traffic classification according to various embodiments. In some embodiments, process 800 is implemented at least in part by system 100 of FIG. 1, system 200 of FIG. 2, and/or system 300 of FIG. 3. Process 800 may be implemented by a system providing security service to an inline security entity, such as to a firewall (e.g., a next generation firewall).

In some embodiments, process 800 is invoked by a security entity in connection with the interception of DNS traffic and/or the handling of DNS traffic. The security entity may implement an ADNS cache, such as the ADNS caches described in connection with system 100 of FIG. 1, system 200 of FIG. 2, system 300 of FIG. 3, ADNS cache 400 of FIG. 4, and/or ADNS cache 500 of FIG. 5.

In some embodiments, process 800 is invoked by 610 of process 600 or 715 of process 700.

At 805, the system obtains an indication that an ADNS response cache is to be queried for a DNS response and/or a cached DNS traffic classification for the DNS record. At 810, the system obtains information pertaining to the DNS response. At 815, the system determines a type of the DNS response based at least in part on the information pertaining to the DNS response. For example, the system determines whether the DNS response is associated with a DNS record that is (a) an A type DNS record, (b) an AAAA DNS record, (c) an MX type DNS record, (d) an NS type DNS record, (e) a CAME type DNS record, (f) a PTR type DNS record, (g) an SOA type DNS record, (h) an SRV type DNS record, and/or (I) a TXT type DNS record. At 820, the system determines a cache (e.g., a particular cache) comprised in the ADNS response cache to be queried for a cached DNS traffic classification. The system determines the cache based at least in part on the type of the DNS response (e.g., the type of DNS record associated with the DNS response). In some embodiments, the system (e.g., the security entity, the ADNS response cache, etc.) stores a mapping of DNS record types to caches in the ADNS response cache (e.g., caches that store the cached DNS traffic classifications for those particular DNS record types). In response to determining the type of cache comprised in the ADNS response cache to be queried, at 825, the system queries the cache for the cached DNS traffic classification. At 830, the system determines whether the cache (e.g., the queried cache, or more generally, the ADNS response cache) comprises a corresponding entry. For example, the system determines whether the queried cache comprises a cached DNS traffic classification for the NDS record associated with the DNS response sample. In response to determining that the cache comprises a corresponding entry, process 800 proceeds to 835 at which the system obtains the cached DNS traffic classification. At 840, the system provides the cached DNS traffic classification. In some embodiments, the system provides the cached DNS traffic classification to the process, system, or service that invoked process 800. Conversely, in response to determining that the cache does not comprise a corresponding entry, process 800 proceeds to 845 at which the system provides an indication that the cache does not comprise a corresponding cached DNS traffic classification. In some embodiments, the system provides the indication that the cache does not comprise the corresponding cached DNS traffic classification to the process, system, or service that invoked process 800. At 850, a determination is made as to whether process 800 is complete. In some embodiments, process 800 is determined to be complete in response to a determination that no further DNS traffic is to be handled, no further DNS responses are received, no further DNS responses are to be evaluated, no further DNS responses extracted from intercepted DNS traffic has a corresponding entry in the ADNS cache, an administrator indicates that process 800 is to be paused or stopped, etc. In response to a determination that process 800 is complete, process 800 ends. In response to a determination that process 800 is not complete, process 800 returns to 805.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:

one or more processors configured to:

receive a Domain Name System (DNS) response sample;

determine whether an advanced domain name system (ADNS) response cache local to a security entity stores a cached DNS traffic classification for a DNS record associated with the DNS response sample, wherein the ADNS response cache comprises a plurality of response caches including at least a hash table cache and one or more Hybrid Associative Trie (HAT Trie) caches, and a verdict for a particular DNS record is stored in a particular cache of the plurality of response caches based at least in part on a record type for the particular DNS record; and in response to determining that the ADNS response cache stores the cached DNS traffic classification for the DNS record associated with the DNS response sample, handle the DNS response sample based at least in part on the cached DNS traffic classification obtained from the ADNS response cache; and a memory coupled to the one or more processors and configured to provide the one or more processors with instructions.

2. The system of claim 1, wherein the security entity is a next generation firewall.

3. The system of claim 1, wherein handling the DNS response sample based at least in part on the DNS traffic classification comprises enforcing a predefined security policy based on the DNS traffic classification.

4. The system of claim 1, wherein the one or more processors are further configured to:

in response to determining that the ADNS response cache does not store the DNS traffic classification for the DNS record associated with the DNS response sample, query a cloud security platform for a real-time DNS traffic classification for the DNS record associated with the DNS response sample; and handle the DNS response sample based at least in part on the real-time DNS traffic classification obtained from the cloud security platform.

5. The system of claim 4, wherein the cloud security platform is a cloud security service.

6. The system of claim 4, wherein the cloud security platform determines the real-time DNS traffic classification by querying a classifier.

7. The system of claim 6, wherein the classifier is a machine learning model.

8. The system of claim 4, wherein in response to determining that 100 milliseconds has lapsed since the query to the cloud security platform was sent without receiving the real-time DNS traffic classification, handle the DNS response sample as benign.

9. The system of claim 1, wherein the ADNS response cache comprises a plurality of caches.

10. The system of claim 1, wherein the ADNS response cache comprises a hash table cache.

11. The system of claim 10, wherein the hash table cache stores an entry for one or more of (I) an A type record, and (ii) an AAAA type record.

12. The system of claim 11, wherein the entry comprises a resource record verdict.

13. The system of claim 1, wherein the HAT Trie cache stores an entry for one or more of (I) an MX type record, (ii) an NS type record, (iii) a CNAME type record, (iv) a PTR type record, and (v) an SOA type record.

14. The system of claim 13, wherein the HAT Trie cache stores a domain verdict for an rrname.

15. The system of claim 13, wherein the HAT Trie cache stores one or more of a resource record verdict and a domain verdict.

16. The system of claim 1, wherein:

determining whether the ADNS response cache stores the cached DNS traffic classification for a DNS record associated with the DNS response sample comprises:

selecting one or more selected response caches from the plurality of response caches to query for one or more verdicts to use in connection with determining the cached DNS traffic classification, wherein the one or more selected response caches are selected based at least in part on a record type for which the DNS record corresponds;

querying the one or more selected response caches for the one or more verdicts for the DNS record; and determining the cached DNS traffic classification based at least in part on the one or more verdicts.

17. The system of claim 16, wherein the one or more selected response caches for an A type record or an AAAA type record comprises (a) a hash table cache storing an resource record verdict, and (b) a HAT Trie cache for rrname storing a domain verdict.

18. The system of claim 16, wherein the one or more selected response caches for an MX type record, an NS type record, a CNAME type record, a PTR type record, and an SOA type record comprises: (a) a HAT Trie cache for rrname storing an domain verdict, and (b) a hat tire cache for rradata storing a domain verdict and a resource record.

19. The system of claim 16, wherein the one or more selected response caches for an SRV type record or an TXT type record comprises a HAT Trie cache for rrname storing a domain verdict.

20. The system of claim 1, wherein the one or more processors are further configured to: determine the cached DNS traffic classification by combining at least one resource record verdict obtained from the hash table cache with at least one domain verdict obtained from a HAT Trie cache when the DNS record is an A type record or an AAAA type record.

21. The system of claim 1, wherein:

the ADNS response cache is configured to store entries with an expiry time; and the one or more processors are further configured to: determine whether a cached entry for the DNS record has expired based on the expiry time; and treat an expired entry as a cache miss and query the cloud security platform for a real-time DNS traffic classification.

22. A method, comprising:

receiving a Domain Name System (DNS) response sample;

determining whether an advanced domain name system (ADNS) response cache local to a security entity stores a cached DNS traffic classification for a DNS record associated with the DNS response sample, wherein the ADNS response cache comprises a plurality of response caches including at least a hash table cache and one or more Hybrid Associative Trie (HAT Trie) caches, and a verdict for a particular DNS record is stored in a particular cache of the plurality of response caches based at least in part on a record type for the particular DNS record; and in response to determining that the ADNS response cache stores the cached DNS traffic classification for the DNS record associated with the DNS response sample, handling the DNS response sample based at least in part on the cached DNS traffic classification obtained from the ADNS response cache.

23. A computer program product embodied in a non-transitory computer readable medium and comprising computer instructions for:

receiving a Domain Name System (DNS) response sample;

determining whether an advanced domain name system (ADNS) response cache local to a security entity stores a cached DNS traffic classification for a DNS record associated with the DNS response sample, wherein the ADNS response cache comprises a plurality of response caches including at least a hash table cache and one or more Hybrid Associative Trie (HAT Trie) caches, and a verdict for a particular DNS record is stored in a particular cache of the plurality of response caches based at least in part on a record type for the particular DNS record; and in response to determining that the ADNS response cache stores the cached DNS traffic classification for the DNS record associated with the DNS response sample, handling the DNS response sample based at least in part on the cached DNS traffic classification obtained from the ADNS response cache.

24. A system, comprising:

one or more processors configured to:

receive a Domain Name System (DNS) response sample;

determine whether an advanced domain name system (ADNS) response cache local to a security entity stores a cached DNS traffic classification for a DNS record associated with the DNS response sample, wherein:

the ADNS response cache stores a plurality of response caches; and determining whether the ADNS response cache stores the cached DNS traffic classification for a DNS record associated with the DNS response sample comprises:

selecting one or more selected response caches from the plurality of response caches to query for one or more verdicts to use in connection with determining the cached DNS traffic classification, wherein the one or more selected response caches are selected based at least in part on a record type for which the DNS record corresponds;

querying the one or more selected response caches for the one or more verdicts for the DNS record; and determining the cached DNS traffic classification based at least in part on the one or more verdicts; and in response to determining that the ADNS response cache stores the cached DNS traffic classification for the DNS record associated with the DNS response sample, handle the DNS response sample based at least in part on the cached DNS traffic classification obtained from the ADNS response cache; and a memory coupled to the one or more processors and configured to provide the one or more processors with instructions.

25. A method, comprising:

receiving a Domain Name System (DNS) response sample;

determining whether an advanced domain name system (ADNS) response cache local to a security entity stores a cached DNS traffic classification for a DNS record associated with the DNS response sample, wherein:

the ADNS response cache stores a plurality of response caches; and determining whether the ADNS response cache stores the cached DNS traffic classification for a DNS record associated with the DNS response sample comprises:

selecting one or more selected response caches from the plurality of response caches to query for one or more verdicts to use in connection with determining the cached DNS traffic classification, wherein the one or more selected response caches are selected based at least in part on a record type for which the DNS record corresponds;

querying the one or more selected response caches for the one or more verdicts for the DNS record; and determining the cached DNS traffic classification based at least in part on the one or more verdicts; and in response to determining that the ADNS response cache stores the cached DNS traffic classification for the DNS record associated with the DNS response sample, handling the DNS response sample based at least in part on the cached DNS traffic classification obtained from the ADNS response cache.

* * * * *